INVENTORS.
Edward Kennedy, Henry Martinez,
Herman Paprzycki & Dominick Stabilito,
BY Paul & Paul
ATTORNEYS.

Nov. 20, 1962    E. KENNEDY ETAL    3,064,406
ARTICLE COUNTING AND LOADING MACHINE
Filed Sept. 20, 1957    5 Sheets-Sheet 2
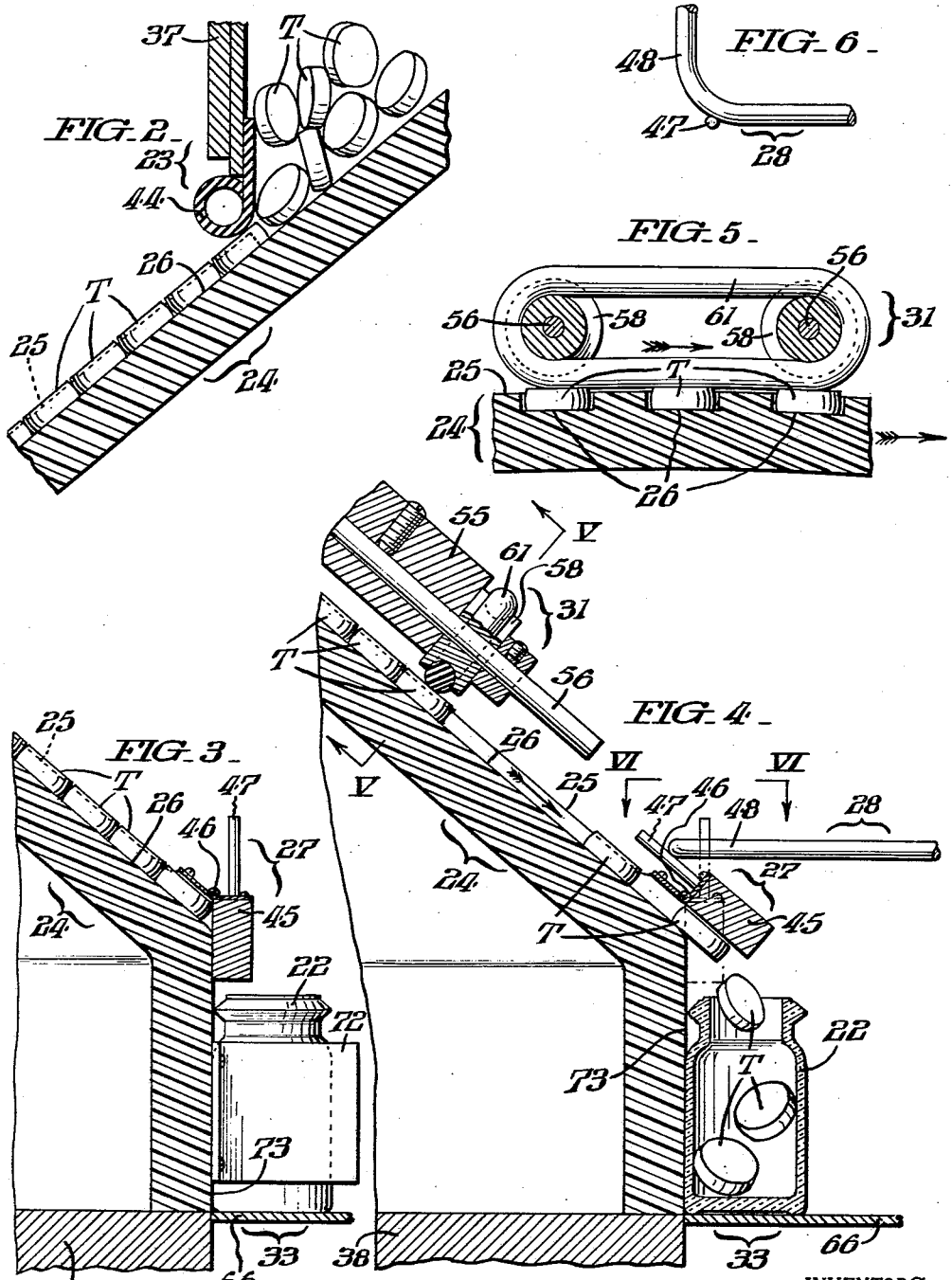
INVENTORS.
Edward Kennedy, Henry Martinez,
Herman Paprzycki & Dominick Stabilito,
BY Paul & Paul
ATTORNEYS.

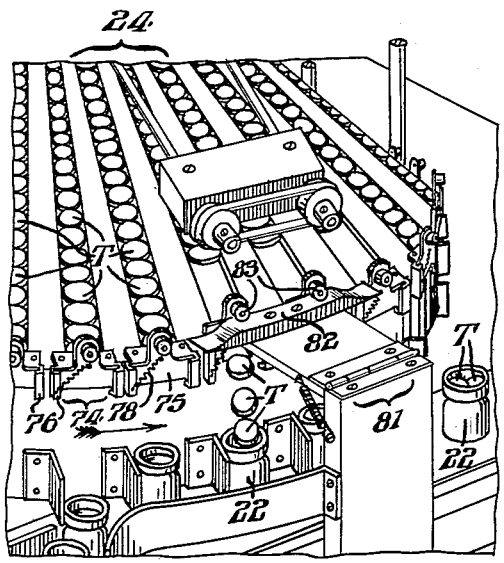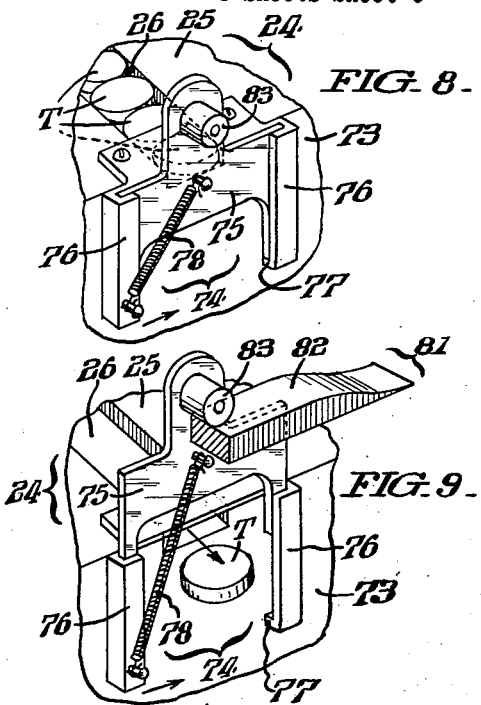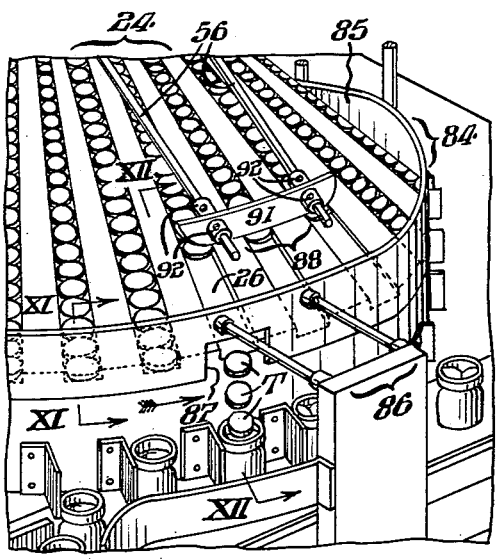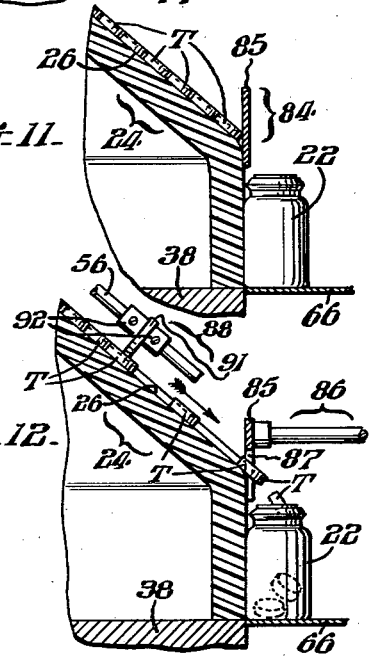

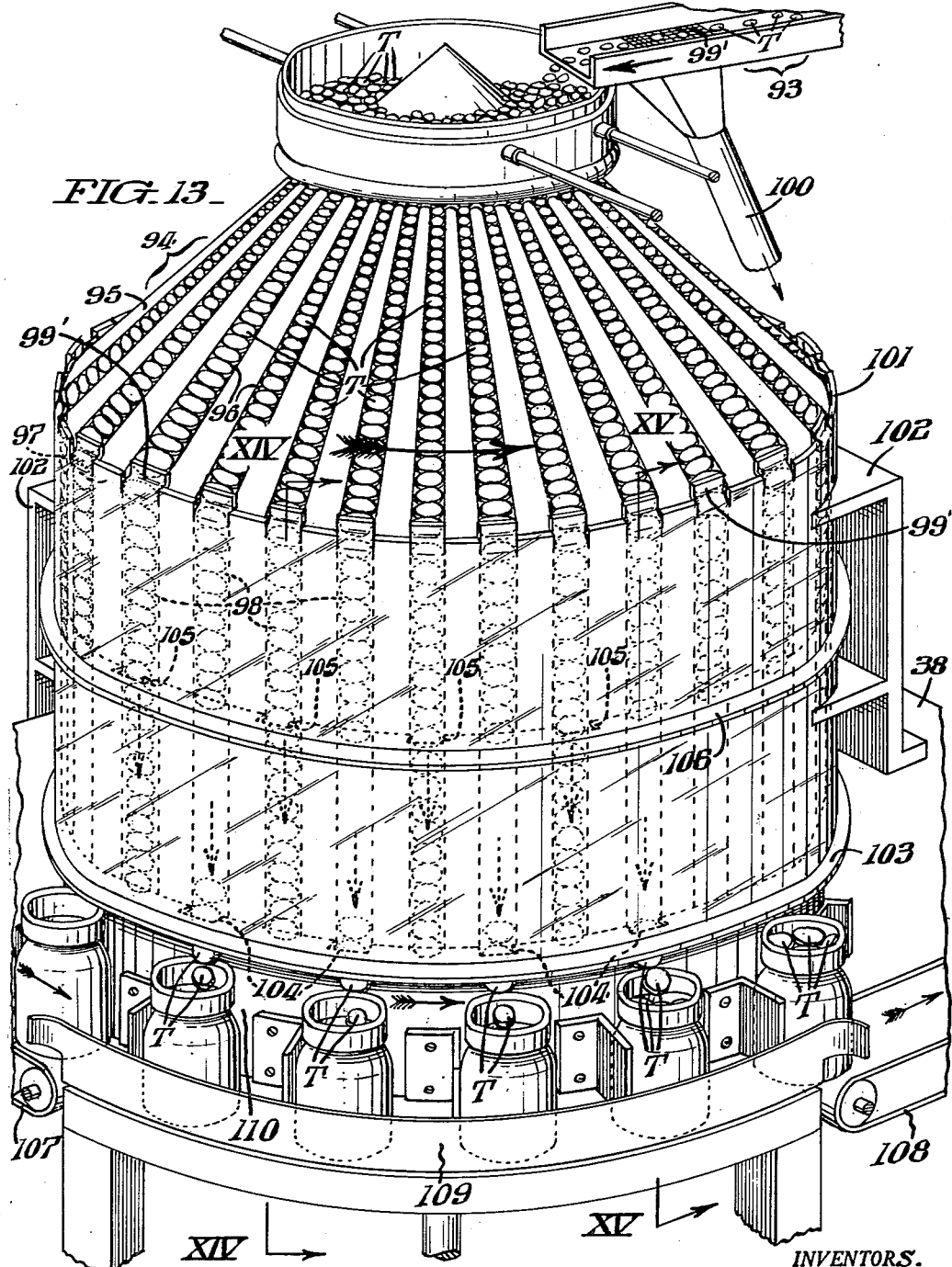

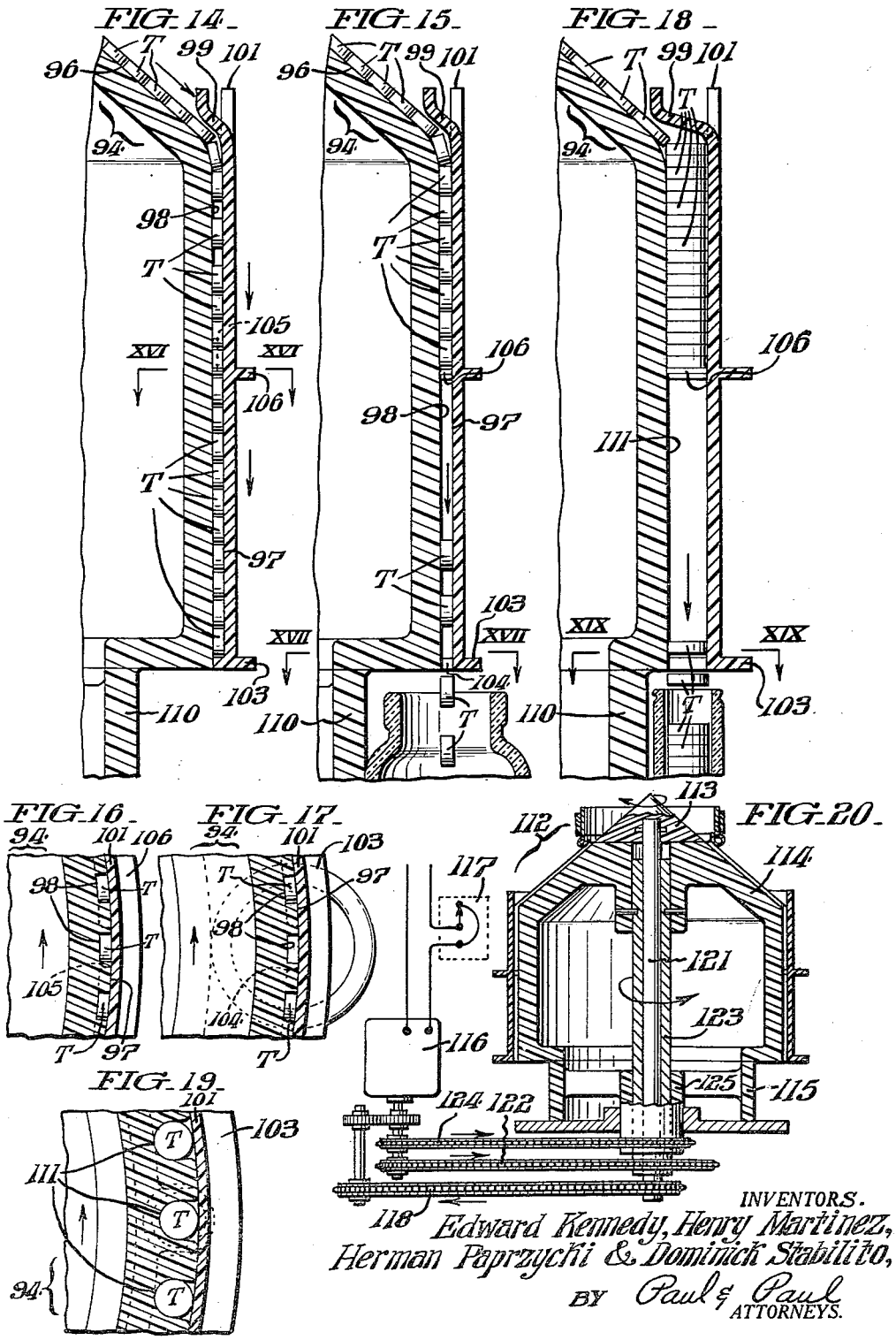

United States Patent Office 3,064,406
Patented Nov. 20, 1962

3,064,406
ARTICLE COUNTING AND LOADING MACHINE
Edward Kennedy and Henry Martinez, Philadelphia, Pa., Herman Paprzycki, Merchantville, N.J., and Dominick Stabilito, Philadelphia, Pa.
Filed Sept. 20, 1957, Ser. No. 685,216
29 Claims. (Cl. 53—240)

This invention relates to improvements in a counting and loading machine for a plurality of discrete articles all of which are essentially of the same size and shape, and more particularly concerns a machine for automatically filling containers with a given number of tablets or the like.

It has long been desired to provide a machine for rapidly and automatically filling containers, each with a counted number of tablets. However, difficulties have heretofore been encountered in providing such a machine. It is difficult to fill the containers rapidly and yet fill them with a uniformly accurate count. It is also important to handle the tablets swiftly but gently so that the tablets are not chipped or broken, thereby jamming the loading machine or reducing the accuracy of the counting mechanism. This is important since the breaking of a tablet can ruin a production run of substantial duration since the counting error may not be discovered for some time. Previous attempts to solve these problems have resulted in machines of such complexity that they are difficult to adjust, and even more difficult to clean. Moreover, prior machines have been adversely affected in their operation by dust liberated from the tablets, which tends to clog the delivery and counting mechanisms.

Accordingly, an object of this invention is to overcome the difficulties hereinbefore mentioned. Another object is to provide a counting and loading machine having an extremely large production capacity that is of simple construction and has relatively few moving parts. Another object is to provide a high-capacity, completely automatic and self-tending machine that is easily adjusted, dusted and cleaned. Other objects are to provide a machine that is easily operated, adaptable, flexible, that fills cans, bottles or any other containers in very short time, that provides a very free flow of tablets or any other articles of uniform size and handles them gently.

A very important object of the invention is to provide a high-capacity machine which is absolutely accurate in its count.

Other objects and advantages of this invention will further become apparent hereinafter and in the drawings, whereof:

FIG. 2 represents an enlarged view in section taken as indicated by the lines and arrows II—II which appear in FIG. 1;

FIG. 3 represents an enlarged view in section taken as indicated by the lines and arrows III—III which appear in FIG. 1;

FIG. 4 represents an enlarged view in section taken as indicated by the lines and arrows IV—IV which appear in FIG. 1;

FIG. 5 represents a view in section taken as indicated by the lines and arrows V—V which appear in FIG. 4;

FIG. 6 represents a partial view in top plan taken as indicated by the lines and arrows VI—VI which appear in FIG. 4;

FIG. 7 represents a partial view similar to FIG. 1 and shows another embodiment of the invention;

FIG. 8 shows an enlarged view of the stop means of FIG. 7 which constitutes one element of the invention;

FIG. 9 represents a view similar to FIG. 8 and shows the stop means at a later stage of operation and being operated upon by the releasing means;

FIG. 10 represents a partial view similar to FIG. 7 and shows another embodiment of the invention;

FIGS. 11 and 12 show stages in operation and are taken as indicated by the lines and arrows XI—XI and XII—XII which appear in FIG. 10;

FIG. 13 represents a view similar to FIG. 1, showing another embodiment of the invention;

FIG. 14 represents a view in section, taken as indicated by the lines and arrows XIV—XIV which appear in FIG. 13;

FIG. 15 represents a view in section, taken as indicated by the lines and arrows XV—XV which appear in FIG. 13;

FIG. 16 represents a view in section, taken as indicated by the lines and arrows XVI—XVI which appear in FIG. 14;

FIG. 17 represents a view in section, taken as indicated by the lines and arrows XVII—XVII which appear in FIG. 15;

FIG. 18 represents a view in section similar to FIG. 15, showing another embodiment of the invention;

FIG. 19 represents a view in section, taken as indicated by the lines and arrows XIX—XIX which appear in FIG. 18; and FIG. 20 represents a view in section showing another embodiment of the invention.

Figure 1:
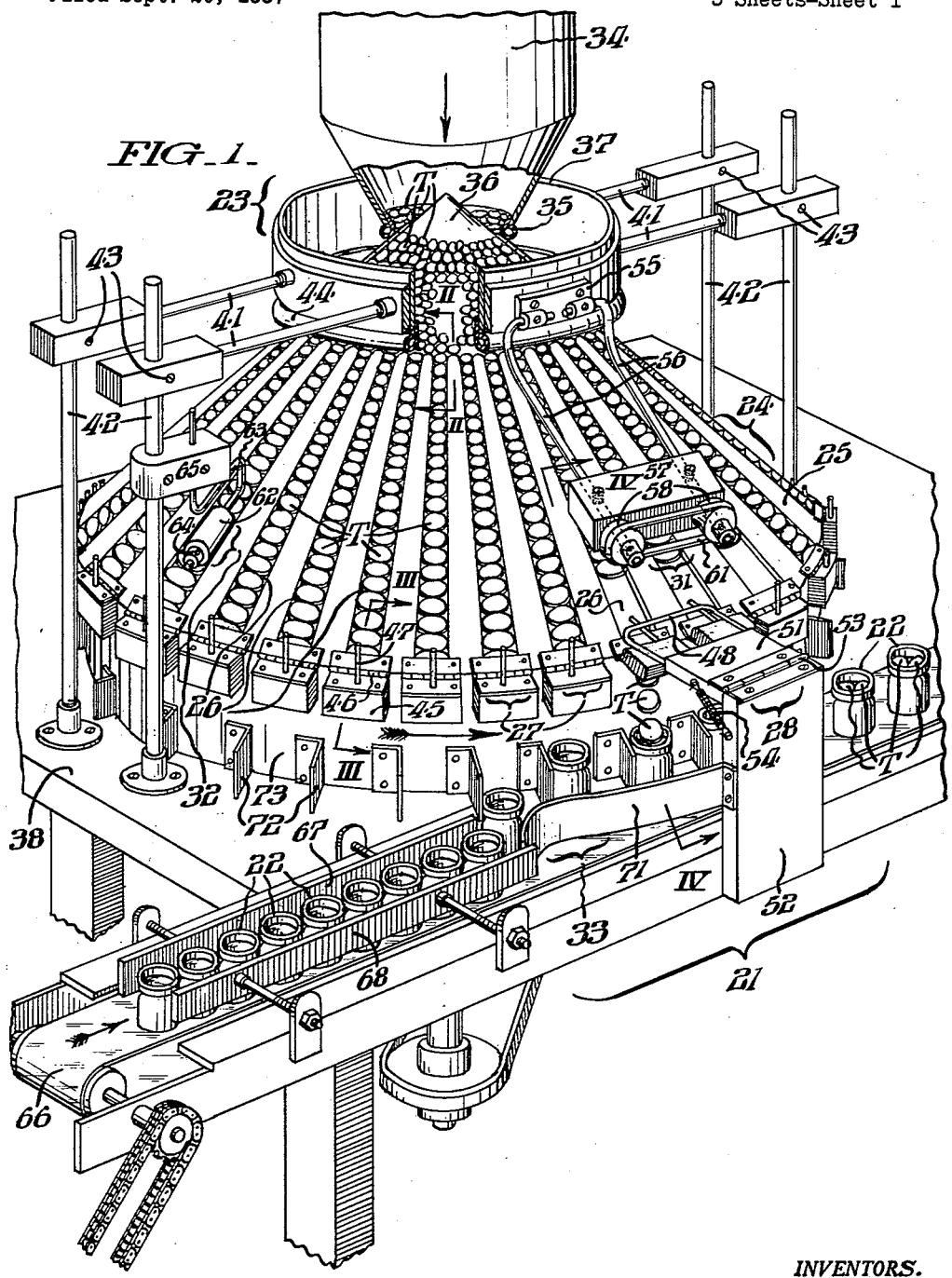
FIG. 1 represents a view in perspective of a tablet counting and loading machine constructed in accordance with this invention.

Although specific terms are used for clarity in the following description, these terms are intended to refer only to the structure shown in the drawings and are not intended to define or limit the scope of the invention. The word "container" is here used to mean any type container of proper size, and includes bottles, boxes or cans. Further, such containers may be constructed of any material such as glass, plastics, or metal, for example. The word "tablet," as it appears in the specification and claims, is intended to include various types and sizes of small articles all having essentially the same size and shape, such as pellets, pills, capsules, candy, nuts, washers, and any other equivalent articles all of the same approximate size and shape.

Turning now to the specific embodiment of the invention selected for illustration in the drawings, the number 21 designates generally a tablet counting and loading machine for counting and loading tablets T into bottles 22. Machine 21 broadly includes a feed means comprehensively designated by the number 23, a rotatable distributor cone 24 which is provided with an inclined surface 25 having a plurality of passages 26 formed therein, a stop means 27 positioned at the lower end of passages 26 for holding the tablets T within the passages 26, controlling or releasing means 28 arranged to release the tablets from the passages 26 when a bottle 22 is positioned under the passage 26, so that the tablets T fall into the bottle 22, and an arresting means 31 for retaining within the passage all but a predetermined number of tablets T. Arresting means 31 is adjustable and serves the dual purpose of counting the number of tablets located below it, to be released into the bottle, and retaining within the passage 26 all of the tablets located above it, which are not to be released. Also provided are roller means 32 for flattening the tablets within the passages 26, and bottle guide and conveyor means 33 for positioning a succession of bottles beneath the lower ends of the passages 26 and for swinging the bottles around beneath the passages 26.

Referring now to the specific structure of the apparatus as shown in FIGS. 1–6, the feed means 23 includes a funnel 34 which has its lower edge 35 positioned in close proximity to (but spaced slightly away from) the top portion 36 of cone 24, and a distributor ring 37 which is adjustably supported on arms 41 which extend from vertical post 42 standing on a table 38. Arms 41 are slidable on posts 42 and are fixed by set-screws 43. The lower edge of ring 37 is provided with a rubber guard guide 44 which places the tablets in a flat position as they enter passages 26.

Means are provided for rotating the cone 24, as will be described in further detail, and the rotation of distributor cone 24 frees the tablets from jamming so that they may flow by gravity into passages 26 where they fall into the positions shown in FIG. 1. The tablets T are retained or stopped at the lower ends of the passages 26 by the action of stop means 27. Each stop means 27 includes a door 45 mounted on a hinge 46, which blocks the corresponding passage 26, retaining the tablets T in such passage.

Controlling means 28 includes a cam follower pin 47 fixed on the door 45, and a stationary cam rod 48 which extends from a horizontal cam support 51. Horizontal support 51 is joined to vertical support 52 by hinge 53 and is held in horizontal position by a spring 54.

Arresting means 31 includes a bracket 55 which is fixed to distributor ring 37. Pivotally connected to bracket 55 is a pair of arms 56 which supports at its lower end a block 57 and sheaves 58. Block 57 and sheaves 58 are adjustable to any position along arms 56. Sheaves 58 support a resilient, friction arresting belt 61 which contacts certain tablets to retain within the passages all those located above it, and to release a given number of tablets, which are located below it, into the bottles.

Roller means 32 includes a roller 62 which is positioned to contact the tablets and flatten them within passages 26. Roller means 32 includes a roller arm 63, an adjustable collar 64, and an adjustable bracket 65 which is slidable on post 42 to any desired position.

Bottle guide and conveyor means 33 includes a conveyor 66, adjustable conveyor guards 67, 68 and 71, and lugs 72 which are mounted on the vertical surface 73 of distributor cone 24. Lugs 72 are located for swinging the bottles around beneath the passages 26.

FIG. 2 shows the tablets T as they enter passages 26, while FIG. 3 shows the tablets as they are held within grooves 26 by door 45. FIG. 4 shows the filling operation with door 45 held open by the action of cam rod 48 on cam follower pin 47, and with belt 61 arresting and retaining within the grooves all but the tablets to be released. FIG. 5 shows the action of belt 61 in retaining the tablets, and FIG. 6 shows cam follower pin 47 at its rounds the turn in stationary cam rod 48.

FIGS. 7–9 show a machine similar to that of FIG. 1 except for the construction of the stop means and the controlling means. In this embodiment, stop means 74 includes a sliding door 75 which slides within channels 76 which are fixed to cone 24 at the bottom of passages 26. Channels 76 are provided with stop flanges 77 and the door 75 is restrained against upward movement by spring 78. Controlling means 81 includes a cam 82 and a cam follower roller 83 which is rotatably mounted on the upper portion of sliding door 75.

FIGS. 10–12 show another embodiment of the invention which is similar to that shown in FIG. 1 except for the construction of the stop means, of the controlling means, and of the arresting means. Stop means 83 includes a band 85 which is fixedly mounted about cone 24. Controlling means 86 is an opening 87 which is positioned appropriately in band 85. Arresting means 88 includes an arresting plate 91 which is adjustably mounted on arms 56 by adjustable collars 92. FIG. 11 shows the position of the elements in their non-loading position, and FIG. 12 shows their position in loading position.

FIGS. 13–17 shows another embodiment of the invention which is similar to that shown in FIG. 1 except that funnel 34 has been replaced by a vibrating feeder 93 and except for the construction of the distributor cone, the stop means, the controlling means, and the arresting means. Additionally, roller means 32 has been omitted. Cone 94 is provided with an inclined surface 95 which has formed therein inclined passages 96 and is also provided with a vertical surface 97 which has passages 98. A hood 99 is provided above each channel at the base of the cone, to prevent "piggy-backing" of the tablets as they move along passages 96 to the passages 98. Passages 98 provide greater storage capacity for tablets in a releasable position. Vibrating feeder 93 is preferably provided with a screen 99 which passes "fines" (fine particles of tablet material) to a removal apparatus 100 for removing the fines. The vibration also assures the proper stacking of the tablets in their vertical channels.

A clear plastic cylinder 101 is positioned around vertical surface 97 and is fixed to table 38 by supports 102. The function of holding the tablets in the passages 98 until they are to be released is accomplished by stop ring 103, and the function of releasing a given number of tablets from passages 98 to the bottles is accomplished by openings 104 in ring 103. In this embodiment, openings 104 are so positioned that more than one bottle is in the process of being filled at the same time. The arresting function is accomplished by arresting ring 105 and the tablets are released from their arrested position by properly positioned openings 106. Additionally, the bottle guide and conveyor means are constructed somewhat differently than the previously described embodiments, and include conveyors 107, 108, and bottle guide 109. Lug supporting member 110 revolves independently of cone 94 for better control of the bottles.

FIGS. 14 and 16 are sectional views, showing the machine of FIG. 13 in non-loading position; and FIGS. 15 and 17 are similar sectional views, showing the machine of FIG. 13 in bottle loading position.

FIGS. 18 and 19 are sectional views similar to FIGS. 15 and 17, and show a different construction of a vertical passage 111 which provides for arranging the tablets in stacks.

FIG. 20 shows another embodiment of the invention in which a cone 112 has a top portion 113 and a bottom portion 114. Top portion 113 is rotated in one direction and bottom portion 114 is rotated in the opposite direction. Preferably top portion 113 is rotated at a greater speed than bottom portion 114. This rotation uniformly feeds the tablets to the passages. For greater flexibility in handling the bottles, a lug supporting member 115 is constructed to revolve independently of top portion 113 and bottom portion 114. Motor 116 supplies the rotating power and the speed of the motor is controlled by rheostat 117. Top portion 113 is driven by chain 118 through shaft 121; bottom portion 114 is driven by chain 122 through cylindrical shaft 123; and revolving member 115 is driven by chain 124 through cylindrical shaft 125.

In operation of the embodiment of the counting and loading machine shown in FIGS. 1–6, tablets T are continuously fed to the top of distributor cone 24 which is continuously rotating. This rotation frees the tablets from jamming so that they slide by gravity down into passages 26. The tablets lie on their flat side in order to slide beneath rubber guard guide 44 of distributor ring 37. The tablets are blocked by doors 45 from sliding out of the lower end of passages 26. Bottles are fed to machine 21 by conveyor 66 and guides 67, 68 and 71, and are carried along with the cone by lugs 72. As the bottles reach the proper point in this rotation, stationary cam rod 48 acts on cam follower pin 47 and swings door 45 open to release a given number of tablets which fall into the bottles. Only the desired number of tablets is released, the remaining tablets being arrested and retained within the passage 26 by belt 61. Belt 61 moves by frictional contact with the tablets and is adjusted up or down along the face of the cone to bear on the tablet immediately above the last one to be dropped. As the cone 24 continues its rotation, cam follower pin 47 leaves stationary cam rod 48 and door 45 closes. The continued rotation moves the passage 26 from under belt 61 and releases the arrested tablets which slide down the passage until the foremost one contacts door 45. Since the tablets within passage 26 thus fall to the lower end of the passage, there is created an empty space at the upper end of the passage which is immediately refilled with new tablets from top portion 36 of cone 24. Lugs 72 move the filled bottles onto the discharge part of conveyor 66. Further rotation of distributor cone 24 brings the refilled passages 26 back into position over empty bottles which are then filled. The operation is a continuous one, the cone rotates at a uniform speed, and the bottles move at a uniform speed.

The operation of the embodiment shown in FIGS. 7–9 is similar. Here however the tablets T are released into the bottles 22 from the passages 26 by sliding the door 75 upwardly in channels 76 against the action of spring 78. This is accomplished when the roller 83 rolls along cam 82. FIGS. 8 and 9 illustrate the operation.

The operation of the machine of FIGS. 10–12 is also similar except that the tablets T are held in the passages 26 by band 85 and are released through opening 87.

The operation of the embodiment shown in FIGS. 13–17 is similar except that vertical passages 98 provide more storage space for tablets T in a releasable position. Stop ring 103 holds the tablets T within the passages 96, 98, openings 104 release the tablets into the bottles 22, and arresting ring 105 retains the remaining tablets in the passages as the desired number is being released to the bottle 22. Openings 106 are provided for refilling the bottom portion of vertical passages 98. In this embodiment, a number of bottles may be filled simultaneously.

In the operation of the embodiment of the invention shown in FIG. 13, each bottle is partially filled as it passes beneath each opening 104. This cumulative feed enables the operator to fill bottles with large quantities of tablets and still handle the tablets gently. For example, instead of dropping 40 tablets at one time into a bottle which, because of the height of the upper tablets, would cause breakage, the machine makes four drops of 10 tablets. The drops are made from each of the four openings 104 as the bottles swing around cone 94.

It is preferred that each passage 98 have a bottle positioned beneath it and that cone 94 and member 110 rotate together at the same speed. But the machine accommodates less or more bottles per passageway by setting member 110 at an appropriate speed. It will be noted in FIG. 13 that not every passage 98 has a bottle positioned beneath it. This is because large bottles are too wide to permit such positioning. Instead the bottles are positioned under every other passage 98 and the lug revolving member 110 is rotated at twice the speed of cone 94 in order to utilize all of the passages 98. Lug revolving member 110 is recessed from the outer edge of cone 94 to accommodate the large bottles.

The operation of the embodiment of FIGS. 18 and 19 is similar to the other embodiments except that here the tablets are arranged in stacks and are loaded into a bottle having a configuration approximating that of the stacked tablets. Instead of an arresting ring 105, a belt may be used to retain the tablets in the passages as the desired number is being released to the bottle. The use of a belt is especially desirable in the embodiment of FIGS. 18 and 19 where, unless the tablets have a high crown, it may be difficult for a ring 105 to knife between adjacent tablets.

The operation of the embodiment of FIG. 20 provides for rotating top portion 113 in a direction opposite to bottom portion 114 and preferably at a greater speed. It also provides for rotating lug supporting member 115 independently of top portion 113 and bottom portion 114.

From the foregoing it is seen that the tablet counting and loading machine is adapted for rapidly and automatically filling containers, each with a counted number of tablets. The tablets are counted by setting the arresting means at any desired point along the inclined surface of the cone. The machine is easily cleaned because the passages are not covered. Its operation is simple and it is relatively maintenance-free since the only moving parts are the rotatable cone, the doors at the ends of the passages, the arresting belt, and the conveyor. The machine is flexible, adaptable, and has filled bottles with four tablets each at a rate of 150 bottles per minute. The machine provides a free flow of tablets and avoids breakage by handling the tablets gently.

It is to be understood that the forms of the invention herewith shown and described are to be taken as preferred embodiments. Various changes may be made in the shape, the size and arrangement of parts. For example, a feature shown in one drawing can be used in any other drawing. Also, the plastic cylinder 101 shown in FIG. 13 may rotate with the rotating cone 94, keeping stationary only the stop ring 103 and the retaining ring 106. Further, the machine may be arranged for multiple loadings in a single revolution of the cone by providing a number of controlling and arresting means. Equivalent elements may be substituted for those illustrated and described herein, parts may be reversed, and certain features of the invention may be utilized independently of the use of other features, all without departing from the spirit or scope of the invention as defined in the subjoined claims.

Having thus described our invention, we claim:

1. A counting and loading machine for a plurality of discrete articles all of which are essentially of the same size and shape comprising an article distributor member having a plurality of downwardly directed, elongated passages thereon; means for rotating said article distributor member about a substantially vertical axis; stop means adjacent said passages; controlling means coacting with said stop means to block and unblock said passages; and arresting means movable relative to said distributor member and arranged adjacent said passages at a location spaced upwardly of said stop means, for arresting the articles above said location preventing their downward movement while said passages are unblocked.

2. A counting and loading machine for a plurality of discrete articles all of which are essentially of the same size and shape comprising a rotatable member having a plurality of downwardly directed elongated passages thereon; stop means adjacent said passages; controlling means coacting with said stop means to block and unblock said passages in predetermined relation to the position of said rotating member in its path of rotation; and an endless belt arranged adjacent said passages at a location spaced upwardly of said stop means, for arresting the articles above said location preventing their downward movement while said passages are unblocked, whereby a predetermined counted number of said articles, located intermediate said stop means and said arresting means, is delivered by gravity each time said passage is unblocked.

3. The counting and loading machine defined in claim 2, wherein said rotatable member is a motor-driven, cone-shaped member that is rotatable about the axis of the cone.

4. The counting and loading machine defined in claim 2, wherein is also provided roller means for flattening the articles within the passages.

5. The counting and loading machine defined in claim 2, wherein is also provided means positioning a succession of containers beneath the lower ends of the passages.

6. The counting and loading machine defined in claim 2, said stop means being positioned at the lower end of the passages and including a door, means hingedly joining the door to the end of the passage, and spring means urging the door to a closed position.

7. The counting and loading machine defined in claim 2, said stop means being positioned at the lower end of the passages and including door means slideable in a pair of channels across the lower end of the passage, and spring means urging the door means to a closed position.

8. A counting and loading machine for a plurality of discrete articles all of which are essentially of the same size and shape comprising a rotatable member having a plurality of downwardly directed, elongated passages thereon; stop means adjacent said passages, said stop means being positioned at the lower end of the passages and including a door, means hingedly joining the door to the end of the passage, and spring means urging the door to a closed position; controlling means coacting with said stop means to block and unblock said passages in predetermined relation to the position of said rotating member in its path of rotation, said controlling means including a cam follower pin projecting from said door, cam means normally positioned so that rotation of the rotatable member brings said pin into contact with the cam means to open the door and unblock said passages; and arresting means arranged adjacent said passages at a location spaced upwardly of said stop means, for arresting the articles above said location preventing their downward movement while said passages are unblocked, whereby a predetermined counted number of said articles, located intermediate said stop means and said arresting means, is delivered by gravity each time said passage is unblocked.

9. A counting and loading machine for a plurality of discrete articles all of which are essentially of the same size and shape comprising a rotatable member having a plurality of downwardly directed elongated passages thereon; stop means adjacent said passages, said stop means being positioned at the lower end of the passages and including door means slideable in a pair of channels across the lower end of the passage, and spring means urging the door means to a closed position; controlling means coacting with said stop means to block and unblock said passages in predetermined relation to the position of said rotating member in its path of rotation, said controlling means including a cam follower roller mounted near the top of said door means, cam means normally positioned so that rotation of said rotatable member brings said roller into contact with the cam means to slide the door open against said spring means and unblock said passages; and arresting means arranged adjacent said passages at a location spaced upwardly of said stop means, for arresting the articles above said location preventing their downward movement while said passages are unblocked, whereby a predetermined counted number of said articles, located intermediate said stop means and said arresting means, is delivered by gravity each time said passage is unblocked.

10. A counting and loading machine for a plurality of discrete articles all of which are essentially of the same size and shape comprising a rotatable member having a plurality of inclined, elongated passages thereon; stop means adjacent said passages; controlling means coacting with said stop means to block and unblock said passages in predetermined relation to the position of said rotating member in its path of rotation, said controlling means including a stationary band positioned at the lower end of the passages, said band having an opening formed therein which is positioned so that rotation of the rotatable member brings the lower end of the passage into register with said opening to unblock said passage; and arresting means arranged adjacent said passages at a location spaced upwardly of said stop means, for arresting the articles above said location preventing their downward movement while said passages are unblocked, whereby a predetermined counted number of said articles, located intermediate said stop means and said arresting means, is delivered by gravity each time said passage is unblocked.

11. A counting and loading machine for a plurality of discrete articles all of which are essentially of the same size and shape comprising a rotatable member having a plurality of inclined, elongated passages thereon; stop means adjacent said passages; controlling means coacting with said stop means to block and unblock said passages in predetermined relation to the position of said rotating member in its path of rotation; and arresting means arranged adjacent said passages at a location spaced upwardly of said stop means, for arresting the articles above said location preventing their downward movement while said passages are unblocked, whereby a predetermined counted number of said articles, located intermediate said stop means and said arresting means, is delivered by gravity each time said passage is unblocked, said arresting means being adjustable up and down in the passages to retain a greater or lesser number of articles.

12. A counting and loading machine for a plurality of discrete articles all of which are essentially of the same size and shape comprising a rotatable member having a plurality of inclined, elongated passages thereon; feed means for feeding the articles to said passages, said feed means including a stationary collar positioned about the top of said rotatable member with the lower edge of said collar spaced away from the bottom of said passages by approximately the thickness of the articles whereby the articless pass beneath the collar into the grooves in flattened position; stop means adjacent said passages; controlling means coacting with said stop means to block and unblock said passages in predetermined relation to the position of said rotating member in its path of rotation; and arresting means arranged adjacent said passages at a location spaced upwardly of said stop means, for arresting the articles above said location preventing their downward movement while said passages are unblocked, whereby a predetermined counted number of said articles, located intermediate said stop means and said arresting means, is delivered by gravity each time said passage is unblocked, said arresting means including a pair of arms pivotally connected to said collar, a block mounted on the other end of said arms and adjustable to various positions by sliding on said arms, a pair of pulleys rotatably mounted on said block, and a resilient belt mounted on the pulleys and constructed and arranged to contact the articles in the passages.

13. A counting and loading machine for a plurality of discrete articles all of which are essentially of the same size and shape comprising a rotatable member having a plurality of inclined, elongated passages thereon; feed means for feeding the articles to said passages, said feed means including a stationary collar positioned about the top of said rotatable member with the lower edge of said collar spaced away from the bottom of said passages by approximately the thickness of the articles whereby the articles pass beneath the collar into the grooves in flattened position; stop means adjacent said passages; controlling means coacting with said stop means to block and unblock said passages in predetermined relation to the position of said rotating member in its path of rotation; and arresting means arranged adjacent said passages at a location spaced upwardly of said stop means, for arresting the articles above said location preventing their downward movement while said passages are unblocked, whereby a predetermined counted number of said articles, located intermediate said stop means and said arresting means, is delivered by gravity each time said passage is unblocked, said arresting means including a pair of arms connected to said collar, and plate means mounted on the other end of said arms and adjustable to various positions by sliding on said arms, the lower edge of the plate being positioned to contact the articles in the passages.

14. A counting and loading machine for a plurality of discrete articles all of which are essentially of the same size and shape comprising a rotatable member having an inclined surface and a vertical surface with a plurality of passages formed in said surfaces, each of said passages having an upper inclined portion and a lower vertical portion; a cylinder positioned around the rotatable member for holding the articles in the vertical portion of the passages; stop means adjacent said passages, said stop means being positioned at the lower end of said passages and including a stop ring positioned below said passages; controlling means coacting with said stop means to block and unblock said passages in predetermined relation to the position of said rotating member in its path of rotation, said controlling means including an opening formed in said stop ring; and arresting means including an arresting ring arranged adjacent said passages at a location spaced upwardly of said stop means, for arresting the articles above said location preventing their downward movement while said passages are unblocked, whereby a predetermined counted number of said articles, located intermediate said stop means and said arresting means, is delivered by gravity each time said passage is unblocked.

15. A tablet counting and loading machine comprising a rotatable cone having a substantially vertical axis, drive means connected to rotate said cone about its axis, said cone having a plurality of spaced, inclined passages extending downwardly from its apex along its surface, feed means for feeding tablets in the vicinity of said apex, passage blocking and unblocking members associated with said passages at locations spaced below said feed means, and a continuous belt adjacent the surface of said cone, located above said blocking and unblocking means but below said feed means, said belt being arranged adjacent the surface of said cone to contact the surfaces of the tablets contained in said passages.

16. The machine defined in claim 15, wherein said belt is carried on a supporting member which extends in the general direction of said passages, and wherein means are provided for shifting said belt along said supporting member.

17. The machine defined in claim 15, wherein said belt is composed of a resilient material, and is arranged with an elongated run extending generally along the path of movement of a selected tablet as said cone rotates, whereby the arcuate movement of said tablet causes said belt to revolve.

18. A counting and loading machine for a plurality of discrete articles all of which are essentially of the same size and shape comprising a rotatable cylinder having a cone at the upper end thereof, substantially vertical passages extending up the walls of said cylinder, an equal number of passages inclined along the surface of said cone from the apex of the cone down to the top of the cylinder, each of said vertical passages being connected at its upper end to the bottom of one of said inclined passages; stop means adjacent said passages; controlling means movable relative to said distributor member and coacting with said stop means to block and unblock said passages; and arresting means movable relative to said distributor member and arranged adjacent said passage at a location spaced upwardly of said stop means, for arresting the articles above said location preventing their downward movement while said passages are unblocked.

19. A counting and loading machine for a plurality of discrete articles all of which are essentially of the same size and shape comprising an article distributor member having a substantially vertical axis and a plurality of elongated downwardly directed passages, means for rotating said article distributor member about said axis, stop means adjacent said passages, arresting means movable relative to said distributor member and arranged adjacent said passages at a location spaced upwardly of said stop means, for arresting the articles above said location preventing their downward movement while said passages are unblocked, and bottle guide and conveyor means operable in timed relation to the rotation of said distributor member for bringing bottles to said distributor member and positioning a bottle under one of said passages, for swinging said bottle along the path of said passage as said bottle is being filled, and for carrying said filled bottle away from said distributor member.

20. A counting and loading machine for a plurality of discrete articles all of which are essentially of the same size and shape comprising an article distributor member having a plurality of elongated downwardly directed passages thereon, means for rotating said article distributor member, stop means adjacent said passages, controlling means coacting with said stop means to block and unblock said passages, arresting means movable relative to said distributor member and arranged adjacent said passages at a location spaced upwardly of said stop means, for arresting the articles above said location preventing their downward movement while said passages are unblocked, conveyor means for bringing a succession of empty containers to said distributor member, registering means for positioning each of said containers directly beneath said passages and in line therewith, means for swinging said containers along the path of movement of said passages as the containers are being filled, and means for conveying the filled containers away from said distributor member.

21. In a machine for counting and loading a plurality of discrete articles all of which are of the same size and shape, said machine including a rotatable member having a plurality of passages thereon, the combination which comprises: stop means adjacent said passages, said stop means being positioned at the lower ends of the passages and including a door, means hingedly joining the door for swinging movement adjacent the end of the passage, spring means urging the door to a closed position, controlling means coacting with said stop means to block and unblock said passages in predetermined relation to the position of said rotating member in its path of rotation, said controlling means including a cam follower pin projecting from said door, cam means normally positioned so that rotation of the rotatable member brings said pin into contact with the cam means to open the door and unblock said passages; and arresting means arranged adjacent said passages at a location spaced upwardly of said stop means, for arresting the articles above said location preventing their downward movement while said passages are unblocked, whereby a predetermined counted number of said articles, located intermediate said stop means and said arresting means, is delivered by gravity each time said passage is unblocked.

22. A combination in a counting and loading machine for a plurality of discrete articles all of which are of the same size and shape, said machine including a rotatable member having a plurality of passages thereon; said combination comprising stop means adjacent said passages, said stop means being positioned at the lower end of the passages and including door means slidable in a pair of channels across the lower end of passage, and spring means urging the door means to a closed position; controlling means coacting with said stop means to block and unblock said passages in predetermined relation to the position of said rotating member in its path of rotation, said controlling means including a cam follower roller mounted near the top of said door means, cam means normally positioned so that rotation of said rotatable member brings said roller into contact with the cam means to slide the door open against said spring means and unblock said passages; and arresting means arranged adjacent said passages at a location spaced upwardly of said stop means, for arresting the articles above said location preventing their downward movement while said passages are unblocked, whereby a predetermined counted number of said articles, located intermediate said stop means and said arresting means, is delivered by gravity each time said passage is unblocked.

23. A combination in a counting and loading machine for a plurality of discrete articles all of which are of the same size and shape, said machine including a rotatable member having a plurality of passages thereon; said combination comprising stop means adjacent said passage; controlling means coacting with said stop means to block and unblock said passages in predetermined relation to the position of said rotating member in its path of rotation, said controlling means including a stationary band positioned at the lower end of the passages, said band having an opening formed therein which is positioned so that rotation of the rotatable member brings the lower end of the passage into register with said opening to unblock said passage; and arresting means arranged adjacent said passages at a location spaced upwardly of said stop means, for arresting the articles above said location preventing their downward movement while said passages are unblocked, whereby a predetermined counted number of said articles, located intermediate said stop means and said arresting means is delivered by gravity each time said passage is unblocked.

24. In a machine for counting and loading a plurality of discrete articles all of which are of the same size and shape, said machine including a rotatable member having a plurality of downwardly extending passages thereon, the combination which comprises: feed means for feeding the articles to said passages, said feed means including a stationary collar positioned about the top of said rotatable member, the lower edge of said collar being spaced away from the bottom of said passages by a distance which equals approximately the thickness of the articles, whereby the articles pass beneath the collar into the grooves in a flattened position, stop means adjacent said passages, controlling means coacting with said stop means operable and effective to block and unblock said passages in a predetermined relation to the position of said rotating member in its path of rotation, and arresting means arranged adjacent said passages at a location spaced upwardly of said stop means, for arresting the articles above said location preventing their downward movement while said passages are unblocked, whereby a predetermined counted number of said articles, located intermediate said stop means and said arresting means, is delivered by gravity each time said passage is unblocked, said arresting means including a pair of arms pivotally connected to said collar, a block mounted on the other end of said arms and adjustable to various positions by sliding on said arms, a pair of pulleys rotatably mounted on said block, and a resilient belt mounted on the pulleys and constructed and arranged to contact the articles in the passages.

25. In a machine for counting and loading a plurality of discrete articles all of which are of the same size and shape, said machine including a rotatable member having a plurality of passages thereon, the combination which comprises: feed means for feeding the articles to said passages, said feed means including a stationary collar positioned about the top of said rotatable member with the lower edge of said collar spaced away from the bottom of said passages by a distance which equals approximately the thickness of the articles whereby the articles pass beneath the collar into the grooves in flattened position, stop means adjacent said passages, controlling means coacting with said stop means to block and unblock said passages in predetermined relation to the position of said rotating member in its path of rotation, and arresting means arranged adjacent said passages at a location spaced upwardly of said stop means, for arresting the articles above said location preventing their downward movement while said passages are unblocked, whereby a predetermined counted number of said articles, located intermediate said stop means and said arresting means, is delivered by gravity each time said passage is unblocked, said arresting means including a pair of arms connected to said collar, and plate means mounted on the other end of said arms and adjustable to various positions by sliding on said arms, the lower edge of the plate being positioned to contact the articles in the passages.

26. A tablet counting and loading machine comprising a rotatable distributor member having a substantially vertical axis, drive means connected to rotate said distributor member about its axis, said distributor member having a plurality of spaced passages extending downwardly along its surface, feed means for feeding tablets to the distributor member, passage blocking and unblocking members associated with said passages at locations spaced below said feed means, and a continuous belt adjacent the surface of said distributor member, located above said blocking and unblocking means but below said feed means, said belt being arranged adjacent the surface of said distributor member to contact the surfaces of the tablets contained in said passages.

27. A tablet counting and filling machine comprising a series of filling heads arranged generally circularly, means to continuously rotate the heads, pockets beneath and rotating with the filling heads to receive containers to be filled, means for introducing the containers individually into said pockets to travel continuously on an arc for a portion only of the full revolution of the filling heads, means for releasing loads from the filling heads into the containers while the containers are in motion with the filling heads, means for discharging the filled containers from the arced path, and means for recharging the filling heads during further rotation thereof prior to again coming into position over empty containers and during the rotation of the heads between the container discharging means and the container introducing means.

28. An article counting and container filling machine comprising a rotatable member, means for rotating said rotatable member, feed means at an upper portion of said rotatable member for feeding articles thereto, means forming a plurality of article-carrying passages extending downwardly on said rotatable member, said passages having discharge openings at their lower ends, a container conveyor, said conveyor having a conveyor portion extending adjacent an arcuate portion of said rotatable member beneath said passages, and further including a conveyor exit portion extending outwardly from said periphery, means for introducing the containers individually into said arcuate portion with a contianer beneath each of said passage discharge openings, blocking means operative at a point spaced above the bottom of each passage adapted to block and unblock movement of the articles in said passage as said rotatable member rotates, stop means below said blocking means to release the articles from said passage, and means for operating said stop means in timed relationship with said blocking means to discharge said articles into the containers on said conveyor.

29. An article counting and container filling machine comprising a base, a rotatable distributor above said base, a drive means, connecting means extending between the drive means and the distributor to rotate the distributor about a substantially vertical axis, means forming a hopper at the top of the distributor for containing a multiplicity of small articles, said hopper having a central dome slanting downwardly and outwardly toward the periphery of the distributor, means on said distributor forming a plurality of article-carrying chutes extending downwardly from said hopper, said chutes having openings at their lower ends, a container conveyor extending to a point on the periphery of said distributor and including a conveyor portion extending adjacent an arcuate portion adjacent the periphery of said distributor, said conveyor further including a conveyor exit portion extending outwardly from another point on the periphery of said distributor, means for causing the containers to travel individually through said arcuate portion for a portion only of the full revolution of said distributor, with a container beneath each of said chute openings, blocking means operative at a point spaced above the bottom of each chute adapted to block and unblock movement of the articles in said chute, gate means below said blocking means and operative in timed relation to said blocking means to release the articles from said chute, and cam means for operating said gate means in said timed relationship with said blocking means to discharge said articles into the containers on said conveyor.

References Cited in the file of this patent

UNITED STATES PATENTS

| | | |
|---|---|---|
| 986,777 | Standish | Mar. 14, 1911 |
| 2,359,183 | Wilsey | Sept. 26, 1944 |
| 2,435,177 | Connell et al. | Jan. 27, 1948 |
| 2,585,558 | Lakso | Feb. 12, 1952 |
| 2,656,962 | Daniels | Oct. 27, 1953 |